US008832161B2

(12) United States Patent  
Sherman et al.

(10) Patent No.: US 8,832,161 B2  
(45) Date of Patent: *Sep. 9, 2014

(54) INTERFACE FOR EXTENDING FUNCTIONALITY OF MEMORY CARDS

(75) Inventors: Itay Sherman, Hod Hasharon (IL); Yaron Segalov, Tel Aviv (IL)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/164,773

(22) Filed: Jun. 21, 2011

(65) Prior Publication Data

US 2011/0314068 A1 Dec. 22, 2011

Related U.S. Application Data

(63) Continuation of application No. 11/725,691, filed on Mar. 20, 2007, now Pat. No. 7,966,355.

(60) Provisional application No. 61/901,353, filed on Feb. 13, 2007.

(51) Int. Cl.
*G06F 12/00* (2006.01)
*G06F 17/30* (2006.01)
*G06F 3/06* (2006.01)

(52) U.S. Cl.
CPC ............ *G06F 3/0643* (2013.01); *G06F 3/0646* (2013.01); *G06F 3/0667* (2013.01); *G06F 3/0679* (2013.01); *G06F 3/0605* (2013.01)
USPC ............................ 707/824; 711/114; 711/172

(58) Field of Classification Search
None
See application file for complete search history.

(56) References Cited

U.S. PATENT DOCUMENTS

| | | | |
|---|---|---|---|
| 5,404,485 A | 4/1995 | Ban | |
| 5,592,669 A | 1/1997 | Robinson et al. | |
| 5,625,673 A | 4/1997 | Grewe et al. | |
| 5,628,055 A | 5/1997 | Stein | |
| 5,633,824 A | 5/1997 | Onuki | |
| 5,708,853 A * | 1/1998 | Sanemitsu | 710/73 |
| 5,809,115 A | 9/1998 | Inkinen | |
| 5,835,772 A * | 11/1998 | Thurlo | 717/139 |
| 5,893,037 A | 4/1999 | Reele et al. | |
| 5,907,815 A | 5/1999 | Grimm et al. | |
| 5,937,423 A | 8/1999 | Robinson | |

(Continued)

FOREIGN PATENT DOCUMENTS

| | | | |
|---|---|---|---|
| EP | 1871075 A1 | 12/2007 | |
| EP | 1783660 B1 * | 10/2012 | |

(Continued)

OTHER PUBLICATIONS

A Novel Memory Hierarchy for Flash Memory Based Storage Systems, Yim, Samsung Advanced Institute of Technology, Dec. 3, 2005.*

(Continued)

*Primary Examiner* — Augustine K Obisesan
(74) *Attorney, Agent, or Firm* — Soquel Group LLC

(57) ABSTRACT

A flash memory card, including a memory and a wireless modem for downloading remote directory listings and media files and streams over the Internet, and a driver for the flash memory card for managing a system of files and directories in the memory, and for invoking an action directed to the wireless modem, wherein the action is associated by the driver with a designated file system command.

5 Claims, 14 Drawing Sheets

(56) References Cited

U.S. PATENT DOCUMENTS

| | | | |
|---|---|---|---|
| 6,088,802 A * | 7/2000 | Bialick et al. | 726/3 |
| 6,188,917 B1 | 2/2001 | Laureanti | |
| 6,201,867 B1 | 3/2001 | Koike | |
| 6,243,578 B1 | 6/2001 | Koike | |
| 6,243,686 B1 | 6/2001 | McPherson et al. | |
| 6,405,278 B1 | 6/2002 | Liepe | |
| 6,442,625 B1 * | 8/2002 | Robinson et al. | 710/8 |
| 6,446,177 B1 * | 9/2002 | Tanaka et al. | 711/163 |
| 6,477,357 B1 | 11/2002 | Cook | |
| 6,516,202 B1 | 2/2003 | Hawkins et al. | |
| 6,588,662 B1 | 7/2003 | Hu | |
| 6,604,170 B1 * | 8/2003 | Suzuki | 711/111 |
| 6,640,113 B1 | 10/2003 | Shim et al. | |
| 6,647,481 B1 | 11/2003 | Luu et al. | |
| 6,690,947 B1 | 2/2004 | Tom | |
| 6,701,421 B1 | 3/2004 | Elnozahy et al. | |
| 6,732,222 B1 * | 5/2004 | Garritsen et al. | 711/103 |
| 6,832,293 B1 * | 12/2004 | Tagawa et al. | 711/115 |
| 6,898,283 B2 | 5/2005 | Wycherley et al. | |
| 6,907,264 B1 | 6/2005 | Sterkel | |
| 6,920,517 B2 | 7/2005 | Mills et al. | |
| 6,999,792 B2 | 2/2006 | Warren | |
| 7,085,542 B2 | 8/2006 | Dietrich et al. | |
| 7,102,671 B1 * | 9/2006 | Asnaashari | 348/231.9 |
| 7,194,285 B2 | 3/2007 | Tom | |
| 7,266,391 B2 | 9/2007 | Warren | |
| 2002/0015362 A1 | 2/2002 | Cowgill et al. | |
| 2002/0090980 A1 | 7/2002 | Wilcox et al. | |
| 2002/0151327 A1 | 10/2002 | Levitt | |
| 2003/0041284 A1 * | 2/2003 | Mambakkam et al. | 714/15 |
| 2003/0045236 A1 * | 3/2003 | Chang et al. | 455/41 |
| 2003/0097520 A1 * | 5/2003 | Lai et al. | 711/103 |
| 2003/0101327 A1 | 5/2003 | Beck | |
| 2003/0160102 A1 * | 8/2003 | Yoshimoto et al. | 235/492 |
| 2003/0163630 A1 | 8/2003 | Aasheim et al. | |
| 2003/0163631 A1 | 8/2003 | Aasheim et al. | |
| 2003/0163632 A1 | 8/2003 | Aasheim et al. | |
| 2003/0172209 A1 | 9/2003 | Liu et al. | |
| 2003/0225960 A1 | 12/2003 | Guu et al. | |
| 2004/0029407 A1 | 2/2004 | Liu et al. | |
| 2004/0177054 A1 | 9/2004 | Stern et al. | |
| 2004/0180535 A1 | 9/2004 | Elliott et al. | |
| 2004/0199712 A1 | 10/2004 | Garritsen et al. | |
| 2004/0210706 A1 | 10/2004 | In et al. | |
| 2004/0210715 A1 * | 10/2004 | Harari et al. | 711/115 |
| 2004/0233930 A1 | 11/2004 | Colby, Jr. | |
| 2004/0252560 A1 | 12/2004 | Hsieh | |
| 2004/0267988 A1 | 12/2004 | Zhang | |
| 2004/0268005 A1 | 12/2004 | Dickie | |
| 2005/0033848 A1 * | 2/2005 | Croome | 709/227 |
| 2005/0036396 A1 * | 2/2005 | Deng et al. | 365/232 |
| 2005/0070225 A1 | 3/2005 | Lee | |
| 2005/0071746 A1 * | 3/2005 | Hart et al. | 715/500.1 |
| 2005/0083794 A1 * | 4/2005 | Tagawa et al. | 369/30.08 |
| 2005/0088521 A1 * | 4/2005 | Blanco et al. | 348/148 |
| 2005/0154819 A1 * | 7/2005 | Conley et al. | 711/103 |
| 2005/0159184 A1 | 7/2005 | Kerner et al. | |
| 2005/0160223 A1 * | 7/2005 | Chen et al. | 711/115 |
| 2005/0216696 A1 * | 9/2005 | Kawaguchi | 711/206 |
| 2006/0003804 A1 | 1/2006 | Liu | |
| 2006/0105722 A1 | 5/2006 | Kumar | |
| 2006/0148462 A1 * | 7/2006 | Zhu et al. | 455/418 |
| 2006/0241353 A1 | 10/2006 | Makino et al. | |
| 2006/0253620 A1 | 11/2006 | Kang | |
| 2007/0004450 A1 | 1/2007 | Parikh | |
| 2007/0018957 A1 | 1/2007 | Seo | |
| 2007/0033373 A1 * | 2/2007 | Sinclair | 711/203 |
| 2007/0076507 A1 * | 4/2007 | Yamagami et al. | 365/230.01 |
| 2007/0079030 A1 | 4/2007 | Okuley et al. | |
| 2007/0130414 A1 | 6/2007 | Ni et al. | |
| 2007/0136555 A1 * | 6/2007 | Sinclair | 711/203 |
| 2007/0161404 A1 | 7/2007 | Yasujima et al. | |
| 2007/0178936 A1 * | 8/2007 | Chiang | 455/557 |
| 2007/0239929 A1 * | 10/2007 | Chen et al. | 711/103 |
| 2007/0288583 A1 | 12/2007 | Rensin et al. | |
| 2007/0291552 A1 * | 12/2007 | Khatami et al. | 365/185.33 |
| 2007/0300009 A1 * | 12/2007 | Rogers et al. | 711/103 |
| 2008/0009325 A1 | 1/2008 | Zinn et al. | |
| 2008/0026794 A1 | 1/2008 | Warren | |
| 2008/0040354 A1 | 2/2008 | Ray et al. | |
| 2008/0046625 A1 | 2/2008 | Spano et al. | |
| 2008/0140886 A1 | 6/2008 | Izutsu et al. | |
| 2008/0147967 A1 | 6/2008 | Nagao | |
| 2009/0276434 A1 * | 11/2009 | Harris et al. | 707/9 |

FOREIGN PATENT DOCUMENTS

| | | | |
|---|---|---|---|
| WO | 9421058 A1 | | 9/1994 |
| WO | WO 9636051 | * | 11/1996 |
| WO | 0059247 A1 | | 10/2000 |
| WO | WO 0175566 A2 | * | 10/2001 |
| WO | 0186922 A1 | | 11/2001 |
| WO | 03103174 A1 | | 12/2003 |

OTHER PUBLICATIONS

An Adaptive Striping Architecture for Flash Memory Storage Systems of Embedded Systems, Chang et al, Proceedings of the Eight IEEE Real-Time and Embedded Technology and Application Symposium, 2002 (RTAS'02).*

New Technique for Real-Time FAT file system in Mobile Multimedia Devices, Park et al, Jan. 15, 2006.*

Improved Flash memory grow in popularity, Real-Tme, Lawton, IEEE Computer Society, 2006.*

"An adaptive striping architecture for flash memory storage systems of embedded systems", Li-Pin Chang et al., Proceedings of the 8th IEEE Real-Time and Embedded Technology and Applications Symposium, 2002.

"An efficient NAND flash file system for flash memory storage", Seung-Ho Lim et al., IEEE Computer Society, May 22, 2006.

"Cost efficient memory architecture design of Nand flash memory embedded systems", Chanik Park et al., Proceedings of the 21st International Conference on Computer Design (ICCD'03), 2003.

"A novel memory hierarchy for flash memory based storage systems", Keun Soo Yim, Samsung Advanced Institute of Technology, 2005.

* cited by examiner

US 8,832,161 B2

INTERFACE FOR EXTENDING FUNCTIONALITY OF MEMORY CARDS

PRIORITY REFERENCE TO RELATED APPLICATIONS

This application is a continuation of U.S. application Ser. No. 11/725,691, entitled INTERFACE FOR EXTENDING FUNCTIONALITY OF MEMORY CARDS, filed on Mar. 20, 2007 now U.S. Pat. No. 7,966,355 by inventors Itay Sherman and Yaron Segalov, which claims benefit of U.S. Provisional Application No. 60/901,353, entitled INTERFACE FOR EXTENDING FUNCTIONALITY OF MEMORY CARDS, filed on Feb. 13, 2007 by inventor Itay Sherman.

FIELD OF THE INVENTION

The present invention relates to flash memory cards.

BACKGROUND OF THE INVENTION

Most computer electronics (CE) and mobile computing devices today support addition of flash memory storage cards in the forms of secure digital (SD), MiniSD, MicroSD and multimedia card (MMC), to expand memory capabilities of the devices. Access to such expansion memory cards is generally based on a file system and a standard access protocol that conforms to the SD or MMC specifications.

SUMMARY OF THE DESCRIPTION

The present invention is used to extend the functionality of SD cards, beyond the local storage functionality that is currently provided. Using the present invention, SD cards can provide wired or wireless communication channels to access remote content servers, and can stream content from, upload content to and download content from these servers.

Using the present invention, SD cards can also include applications that are controlled and displayed by the host device, and implemented on the SD card.

The SD cards of the present invention are compatible with existing SD physical and logical interfaces, and operate transparently with host devices that include SD slots.

There is thus provided in accordance with an embodiment of the present invention an enhanced flash memory card, including a flash memory card, including a wireless modem for downloading remote directory listings, and media files and streams over the Internet, and a memory partitioned into physical data storage clusters, and a driver for the flash memory card (i) for managing a file allocation table (FAT) that stores information about physical and virtual data storage clusters, the FAT including stub files for remote directory listings and remote media files and streams, wherein the stub files link to virtual data clusters, (ii) for managing a download conversion map from virtual cluster numbers to pointers of remote media files and streams, and (iii) for storing downloaded directory listings and media files and streams in the physical data storage clusters.

There is additionally provided in accordance with an embodiment of the present invention a method for remote file access using flash memory, including issuing a read request from a host device to a flash memory file system, the flash memory being represented as a plurality of physical and virtual data storage clusters, wherein the read request is addressed to a virtual data cluster, reading a stub file from a physical data cluster of the flash memory that corresponds to the virtual data cluster, identifying a universal resource locator (URL) that corresponds to the virtual data cluster, receiving remote file data from the URL, and storing the remote file data in physical data clusters of the flash memory.

There is further provided in accordance with an embodiment of the present invention a method for file upload using flash memory, including issuing a write request from a host device to a flash memory file system, the flash memory being represented as a plurality of physical and virtual data storage clusters, wherein the write request is to a directory represented as a stub file in the virtual storage, re-directing the write request to a physical cluster that holds an outgoing directory, writing the file content to a file created in the outgoing directory, sending the created file from the outgoing directory to a designated remote server, and removing the file from the physical storage and from being listed in the outgoing directory listing, after completion of the sending.

There is yet further provided in accordance with an embodiment of the present invention a method for file management, including implementing a file system that includes (i) visible physical sectors, (ii) hidden physical sectors, and (iii) virtual sectors, wherein visible physical sectors are mapped to the file system, hidden physical sectors are not mapped to the file system, and virtual sectors are not resident in a physical memory, mapping a virtual sector to a hidden sector in response to a read or a write command to the virtual sector, prior to performing the read or write command, and performing at least one auxiliary action in response to the read or a write command to the virtual sector.

There is moreover provided in accordance with an embodiment of the present invention an enhanced flash memory card, including a flash memory card, including a memory, and a wireless modem for downloading remote directory listings, and media files and streams over the Internet, and a driver for the flash memory card for managing a system of files and directories in the memory, and for invoking an auxiliary action directed to the wireless modem, wherein the auxiliary action is associated with a designated directory.

There is additionally provided in accordance with an embodiment of the present invention an enhanced flash memory card, including a flash memory card, including a memory, and a media player, and a driver for the flash memory card for managing a system of files and directories in the memory, and for invoking an auxiliary action directed to said media player, wherein the auxiliary action is associated with a designated directory.

There is further provided in accordance with an embodiment of the present invention a method for embedding a wireless modem in a flash memory card, including managing a system of files and directories in a flash card memory storage; generating an AT modem command in response to receiving a write command to a file within a designated directory, comprising copying text specified in the file write command for inclusion in the associated AT command, and issuing the AT modem command for a wireless modem embedded within the flash card.

There is yet further provided in accordance with an embodiment of the present invention a method for embedding a media player in a flash memory card, including managing a system of files and directories in a flash card memory storage, generating a media player command in response to receiving a command to open a file within a designated directory, wherein the media player command corresponds to the name of the file, and issuing the media player modem command to a media player embedded within the flash card.

BRIEF DESCRIPTION OF THE DRAWINGS

The present invention will be more fully understood and appreciated from the following detailed description, taken in conjunction with the drawings in which.

DETAILED DESCRIPTION

The present invention concerns an improved SD memory card that provides extended functionality, including (i) wired or wireless communication channels for accessing remote content servers, and (ii) applications that are controlled and displayed by an SD host device, but are implemented on the SD card. Using the improved SD memory card of the present invention, a device such as an MP3 or MP4 player, can stream music or video from remote content servers, download files from these servers, and upload files to these servers.

Figure 1:
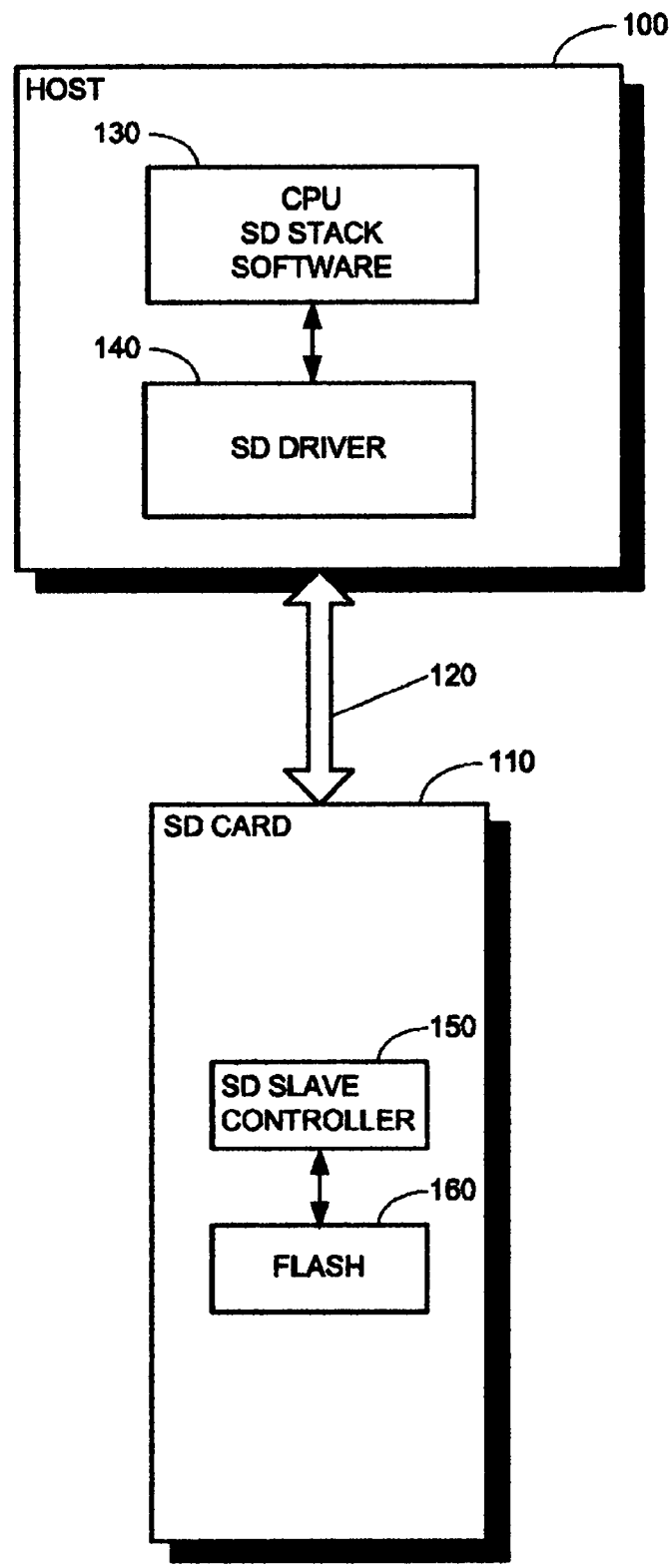
FIG. 1 is a simplified diagram of a prior art SD card interface.

Reference is now made to FIG. 1, which is a simplified diagram of a prior art SD card interface. Shown in FIG. 1 is a host device 100 having an SD slot, and a conventional SD card 110 that can be inserted in the SD slot. A channel 120 enables data communication between host device 100 and SD card 110. Channel 120 also enables SD card 110 to receive electrical power from host device 100.

Host device 100 includes a CPU 130 that is software-controlled to process an SD instruction stack. Host device 100 also includes an SD driver 140.

SD card 120 includes an SD slave controller 150, for accessing a file system that is stored on flash memory 160.

Figure 2:
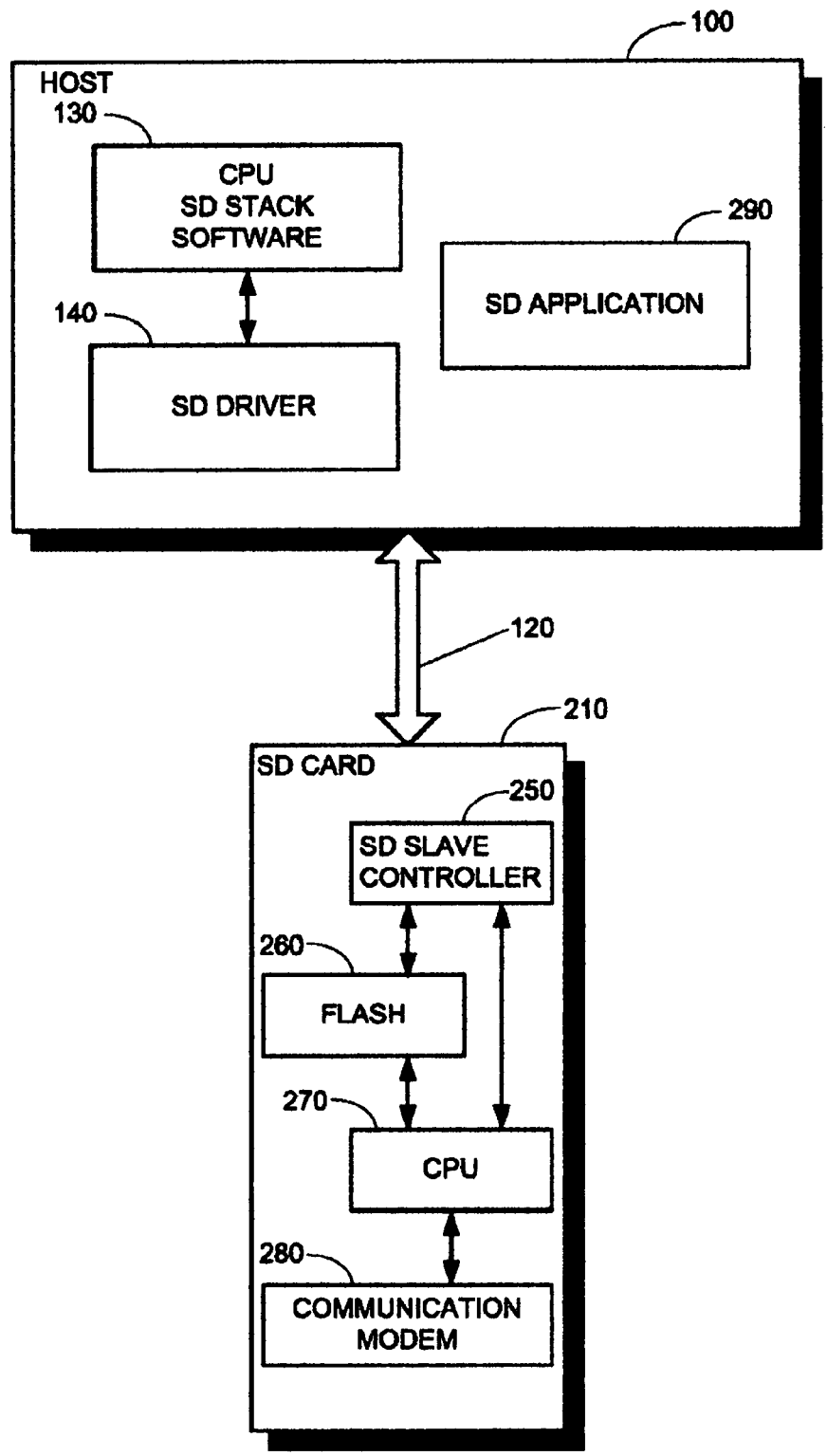
FIG. 2 is a simplified diagram of an SD card interface that provides extended functionality, in accordance with the present invention.

Reference is now made to FIG. 2, which is a simplified diagram of an SD card interface that provides extended functionality, in accordance with the present invention. Shown in FIG. 2 is the same host device 100 as in FIG. 1, and an enhanced SD card 210. Enhanced SD card 210 uses the same interface as standard SD card 110, and thus operates seamlessly with host device 100. Host device also includes an application 290 that performs the extended functionality enabled by enhanced SD card 210. Details of operation of application 290 are described hereinbelow with reference to FIG. 4.

Enhanced SD card 210 includes an SD slave controller 250 and flash memory 260. Slave controller 250 interfaces with host device 100 as a standard SD card, and provides information for a virtual file system. Improved SD card 210 includes a central processing unit (CPU) 270 controlled by embedded software, and a communication modem 280 that interfaces with other devices and networks. Communication modem 280 may be inter alia a cellular modem, a wireless local area network (WLAN) modem, a wireless personal area network (WPAN) modem, and a wireless modem.

The file and directory structure reported by slave controller 250 to host device 100 does not necessarily reflect files and directories that are stored on SD card 210. Directory names may represent names of remote servers accessible via communication modem 280, and they may represent names of services the SD card 210 provides. The operation of opening a directory by the host, signals CPU 270 to access a specific server or activate a specific service.

In accordance with the present invention, file names may represent names of files or streams that are stored remotely on a selected server. Opening a specific file triggers SD card 210 to access the remote file or stream and download it to the card. Immediate access to the file by the host is provided via a dummy copy of the file that may include a place holder message such as "file is currently being downloaded, download will be complete within xx seconds". The place holder message may be provided in the form of an audio file, such as an MP3 or WMA file, or an image file, such as a JPEG of GIF file, depending on the type of file that was requested.

Writing a file to a designated location on SD card 210 operates to upload the file to the selected remote server.

In accordance with the present invention, file names may also be used to designate controls for applications that are executed on SD card 210. Opening of a file designates activation of a corresponding control.

For one usage scenario, SD card 210 may have a directory named "Radio". Selection of this directory activates a radio on the card. In turn, the Radio directory includes a list of files with names "Search Forward", "Search Backward", "Volume Up" and "Volume Down". Opening the "Search Forward" file, for example, activates an instruction to the radio to skip to the next channel.

For another usage scenario, host device 100 writes to a file in a directory named "ATComm". In response, an AT (Attention) command, which includes content written to the file, is issued to communication modem 280. Thus, if the host writes "ATZ" to the file, which is a reset command, the command is transmitted to communication modem 280. The modem reply, which is typically "OK", is written to a second file in the "ATcomm" directory, available for host device 100 to read.

For devices that support more advanced data formats such as HTML pages or Java applications, SD card 210 provides a graphical user interface via an HTML file or Java application file that is stored on the card. The host device opens and executes such file, e.g., main.html, which in turn provides a graphical representation for accessing remote files or for controlling an application on SD card 210. File content and HTML links are changed dynamically corresponding to changes in information or changes in status.

With the graphical user interface, control over SD card 210 is still performed by selecting, opening and writing to files, but the interface is graphical, as coded in the HTML file or Java application.

Implementation Details

Figure 3:
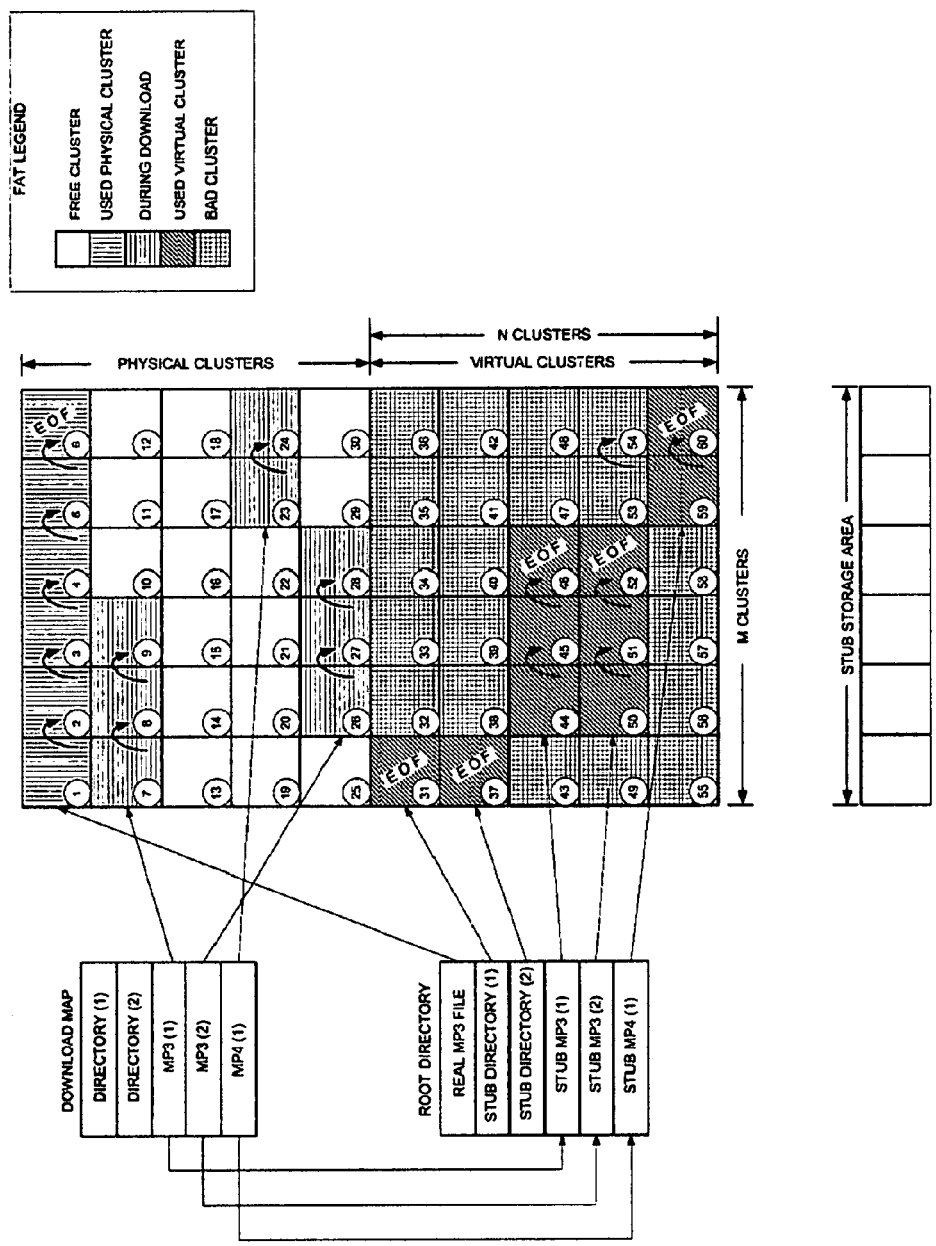
FIG. 3 is a simplified illustration of an arrangement of clusters in an SD card file system, in accordance with an embodiment of the present invention.

As described hereinabove, directory names on SD card 210 may represent names of remote servers, and file names on SD card 210 may correspond to names of remote files and streams. Reference is now made to FIG. 3, which is a simplified illustration of an arrangement of clusters in an SD card file system, in accordance with an embodiment of the present invention. Shown in FIG. 3 is a flash memory in SSD card is SD card 210, represented as including 60 clusters, numbered consecutively from 1 to 60, although clusters 31-60 are virtual, non-physical clusters, as described in detail in what follows.

The physical memory on SD card 210 is generally partitioned into 512 byte sectors, and four sectors are combined to form a 2 KB cluster, although it will be appreciated by those skilled in the art that other partitions are within the scope of the present invention. In FIG. 3 the physical memory includes clusters 1-30. Information regarding available clusters on the SD card 210 is maintained in a file allocation table (FAT). For each cluster, two bytes are stored in the FAT, as follows.
0, if cluster is empty
Next cluster in file, if cluster is not the last cluster in a file
0xFFF8, if cluster is the last cluster in a file
0xFFF7, if cluster is a bad cluster Clusters 1-6 of FIG. 3 correspond to an MP3 file that is stored as a cluster chain. The first cluster in the chain is cluster 1, and the chain continues through clusters 2, 3, 4, 5 and 6, with cluster 6 being the last cluster in the file, designated as an EOF (end-of-file) cluster. The arrows drawn in these clusters represent pointers that advance through the chain of clusters. Clusters 7-9 of FIG. 3 correspond to an MP3 file that is currently being downloaded. As such, cluster 9 is not necessarily an EOF cluster since additional downloaded data may require additional clusters for storage. Similarly, clusters 26-28 correspond to a second MP3 file that is currently being downloaded. Clusters 23 and 24 correspond to an MP4 file that is currently being downloaded. Clusters 10-22 and 25, 29 and 30 are free clusters. The cross-hatching in the clusters of FIG. 3 corresponds to the type of cluster, as indicated in the FAT legend.

Information about files is stored in a directory, designated "ROOT DIRECTORY" in FIG. 3, having 32 byte directory entries generally including the following information.
File name with 8+3 characters
Type—regular file, directory
File size
Date & time
First cluster of file
File names longer than 8+3 characters are obtained by including additional entries for the same file with special attributes. The directory itself is stored in the file system as a regular file.

In the implementation of the present invention illustrated in FIG. 3, the SD file system is extended by declaring the volume to be of a size larger than the amount of available physical flash memory. Host device 100 is not aware of the discrepancy since it never needs to write to the excess volume.

The extended volume includes physical clusters, which are mapped to real flash memory locations, and virtual clusters, which have addresses beyond the available flash memory. Clusters 1-30 in FIG. 3 are physical clusters, and clusters 31-60 are virtual clusters. Upon initialization, the virtual clusters may be marked as bad clusters in the FAT, thereby ensuring that host device 100 does not try to write to these clusters. More generally, when host device 100 is powered up, the flash memory is reset by erasing all file entries in the root directory and clearing the FAT. Physical clusters are marked as being free clusters, and virtual clusters may be marked as being bad clusters.

Virtual clusters are converted to stub locations when they are read. Stub locations include a directory list stub and a media stub, such as an MP3 stub. A directory list stub includes a file with a place holder message such as "file is currently being downloaded, download will be complete within xx seconds", as described hereinabove. A virtual cluster is mapped to an appropriate stub location in the flash memory in such a way that distinct virtual clusters correspond to distinct stub files.

Clusters 31 and 37 in FIG. 3 are directory list stubs. Clusters 44-46, clusters 50-52 and clusters 59-60 are media stubs. Media stubs are cluster chains that end at an EOF cluster. Clusters 44-46 and clusters 50-52 correspond to an MP3 stub, and cluster 59-60 corresponds to an MP4 stub. Clusters 32-36, 38-43, 47-49 and 53-58 are marked as bad clusters. It is noted that MP3 stubs are generally identical, since they generally contain the same place holder message. More generally, media stubs for a specific media type, such as MP3 stubs, JPG stubs or MP4 stubs, are identical.

The number of virtual clusters that are defined equals N*M, where N is the maximum number of concurrent stubs required, and M is the maximum number of clusters for stub data. Typically, one cluster is used for a directory list stub, and 50 clusters, corresponding to 100 KB, are used for a media stub. For simplicity, FIG. 3 is drawn with N=5 and M=6. In practice, reasonable values for N and M are 256 and 64, respectfully, and accordingly the number of virtual clusters is $2^{14}$. As such, the virtual clusters require 32 KB for their FAT entries.

A portion of the flash memory, designated in FIG. 3 as "STUB STORAGE AREA", that contains M clusters is used to store stub file data and is not mapped to the file system. Only SD controller 250 can access this storage area of the flash memory. The M clusters in the stub storage area are hidden clusters; specifically, they are physical clusters in the flash memory but they are not mapped directly on the FAT. When virtual clusters are read, the virtual cluster locations are converted to hidden cluster locations.

Stub files have valid directory entries, which point to virtual clusters as the first file cluster. All subsequent clusters in the stub files are also virtual clusters. Referring to FIG. 3, clusters 44-46, clusters 50-52 and clusters 59-60 are cluster chains for stub files. Each stub file points to a different virtual cluster, although they may contain the same stub data. Consequently, SD controller 250 knows which file to download based upon the virtual sector number requested by host device 100. Specifically, the hidden sector number to read from the stub storage area is V (mod 4M), where V is the virtual sector offset inside the virtual sector area. The term 4M arises from the 4 sectors per cluster. More generally, if there are K sectors per cluster, then the hidden sector number to read is V (mod K*M).

When a remote file or stream is downloaded, it is stored on SD card 210 in a FAT cluster chain, just as a local file is stored. However, the directory entry for the file does not point to the first cluster in the chain. A download map from virtual cluster number to {file name, file type, pointer to file on remote server, first real cluster} is used to maintain a list of all current stub files, including files in stub mode and files in downloading mode. Links that can be clicked on by a user have entries in the download map, along with a stub file directory entry with a file type of the form DIRECTORY, MP3, MP3_STREAM, or such other media type. When a file is finished being downloaded, it is removed from the download map.

Shown in FIG. 3 is a download map with entries for two directories and two MP3 files, corresponding to the stubs in the root directory. The MP3 files being downloaded are currently stored in clusters 7-9 and clusters 26-28.

Figure 4:
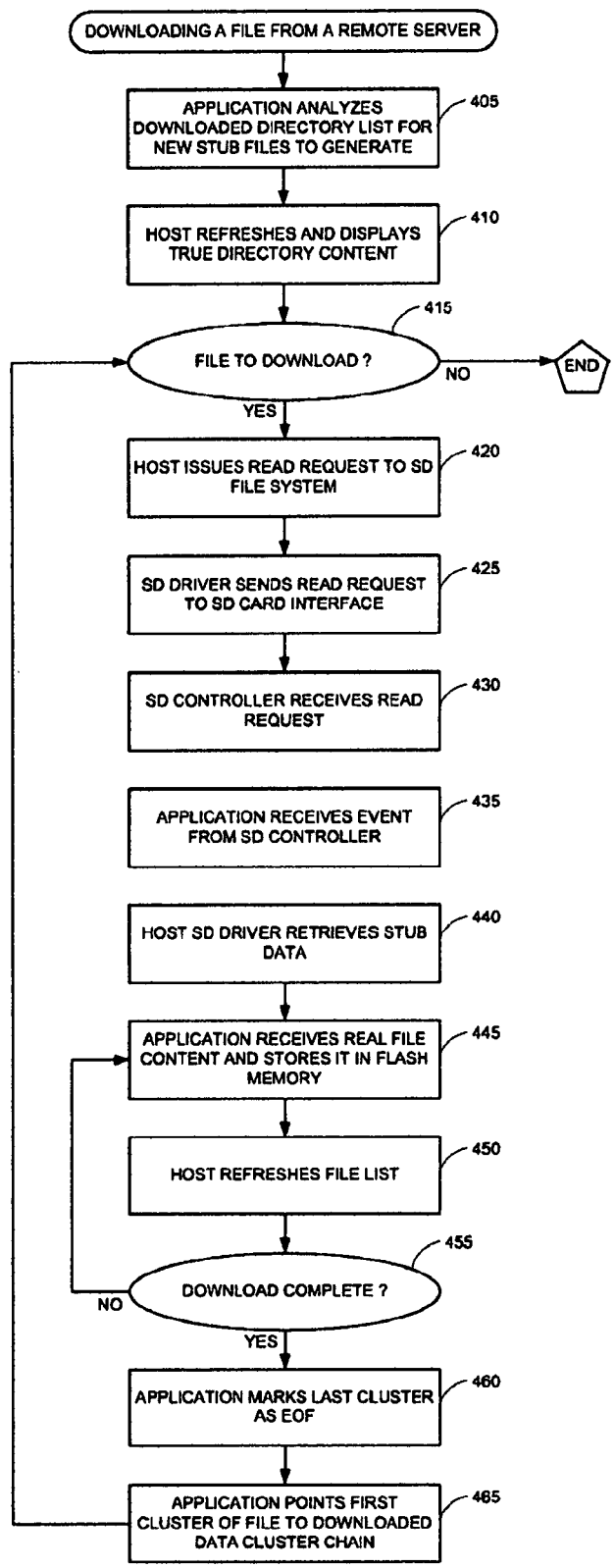
FIG. 4 is a simplified flowchart of a method for downloading a file from a remote server to an SD card, in accordance with an embodiment of the present invention.

Reference is now made to FIG. 4, which is a simplified flowchart of a method for downloading a file from a remote server to an SD card, in accordance with an embodiment of the present invention. To accompany FIG. 4, reference is also made to FIGS. 5A-5D, which are snapshots of a user interface and a file system for a simple example use case, during various stages of file download during operation of the method of FIG. 4. Each of FIGS. 5A-5D are divided into three portions. The leftmost portion illustrates a user interface, the middle portion illustrates directory entries and the download map, and the rightmost portion illustrates the FAT. Thus, whereas FIG. 4 describes the steps being performed, the accompanying FIGS. 5A-5D illustrate states of the user interface and the file system during various ones of the steps. The legends for the cross-hatching on the FATs in FIGS. 5A-5D are the same as the legend provided in FIG. 3. It will be appreciated by those skilled in the art that the file system illustrated in FIGS. 5A-5D is simplified, in order to emphasize the workings of an embodiment of the present invention.

Referring to FIG. 4, in general at step 405, application 290 analyzes a downloaded directory file for new stub files to create. The directory content is recursively searched by application 290. For each file discovered a directory listing stub or media stub is created, corresponding to the file type.

Figure 5A:
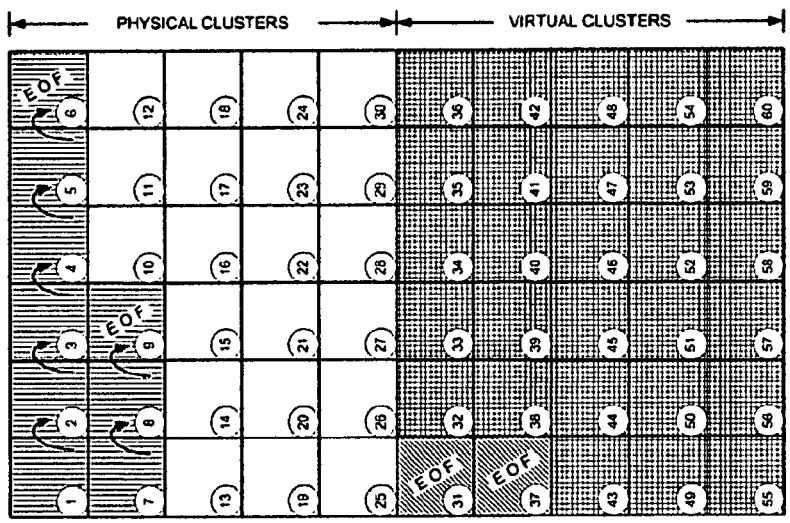
FIG. 5A is a snapshot of a user interface and a file system for a simplified example use case of file downloading, at a stage where a user is browsing a remote directory, in accordance with an embodiment of the present invention.
Figure 5A:
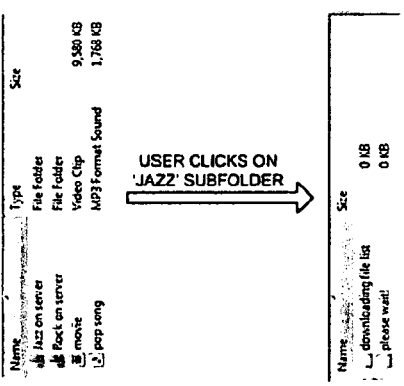

FIG. 5A corresponds to an initial stage wherein a user is browsing a downloaded remote directory listing, as shown in the leftmost portion of FIG. 5A. At this stage, the root directory has entries for two stub directories; namely, a "jazz" stub directory at virtual cluster 31, and a "rock" stub directory at virtual cluster 37. The root directory also has entries for two local files; namely, a movie stored at clusters 1-6, and a pop song stored at clusters 7-9. The download map has URL entries for two remote directories; namely, a "jazz" directory at virtual cluster 31 has URL http://music.com/jazz, and a "rock" directory at virtual cluster 37 has URL http://music.com/rock.

Figure 6:
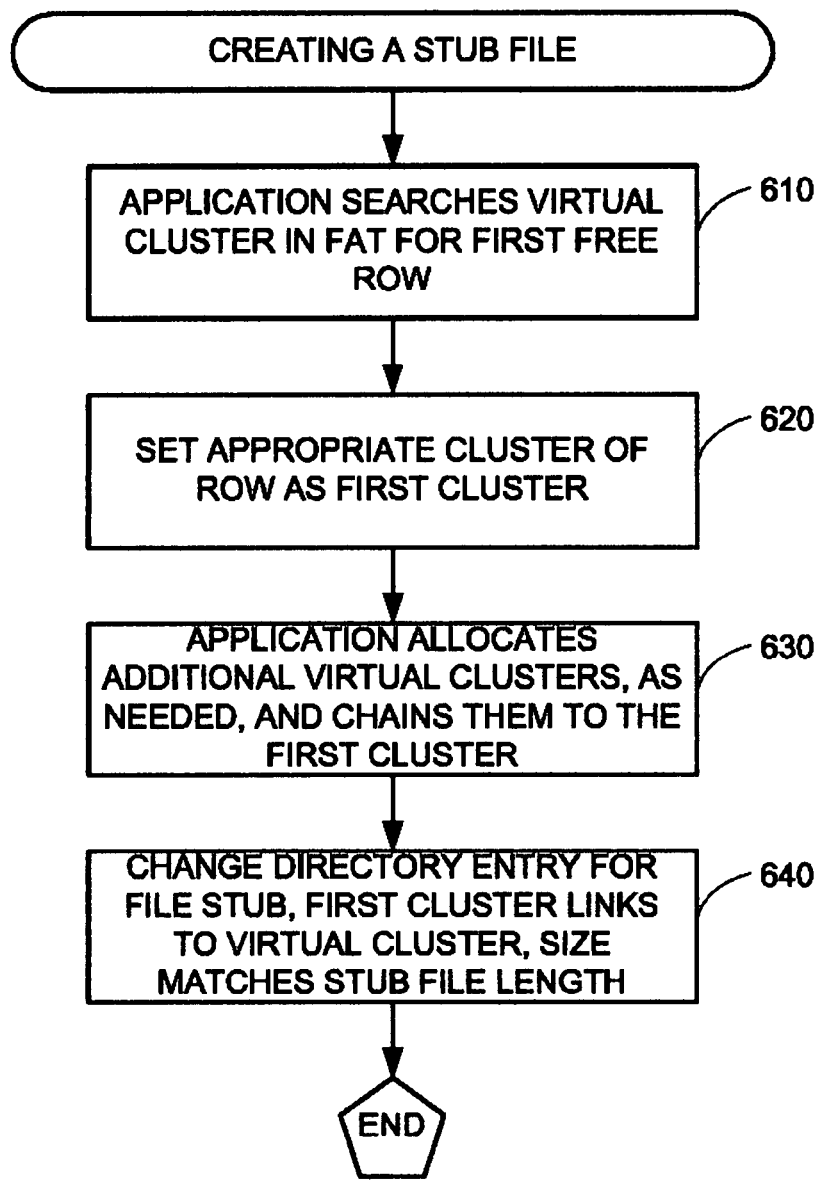
FIG. 6 is a simplified flowchart of a method for generating a stub file, in accordance with an embodiment of the present invention.

Reference is now made to FIG. 6, which is a simplified flowchart of a method for generating a stub file in step 405 of FIG. 4, in accordance with the present invention. At step 610, application 290 searches the virtual clusters in the FAT, such as clusters 31-60 in FIG. 5A, for the first free row; namely, the first row with clusters marked as bad clusters. At step 620 the first applicable cluster in the row found at step 610 is set as the first cluster of the stub file, according to the type of stub file. Specifically, for the example FAT shown in FIG. 3, the applicable cluster for directory list stubs is the first cluster in the row, for MP3 stubs is the second cluster in the row, and for MP4 stubs is the fifth cluster in the row. Such an arrangement ensures that the different types of stubs correspond to different hidden clusters in the stub storage area.

Figure 5B:
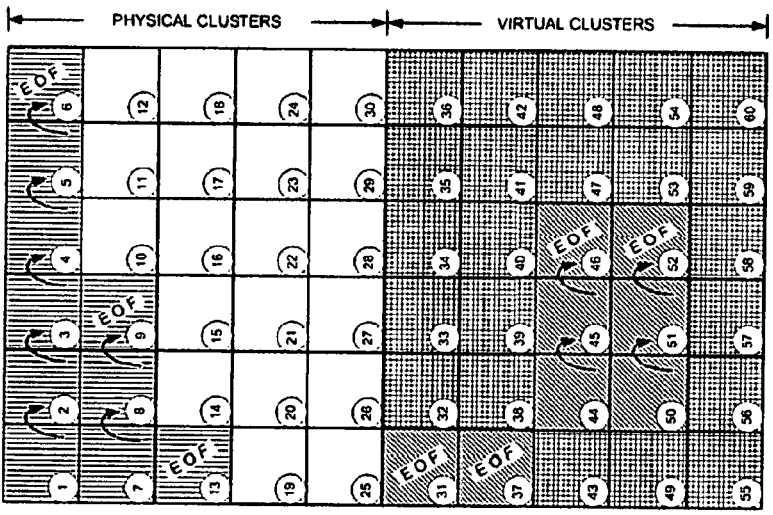
FIG. 5B is a snapshot of a user interface and a file system for a simplified example use case of file downloading, at a stage where a user is issuing a request to download a file from a remote server, in accordance with an embodiment of the present invention.
Figure 5B:
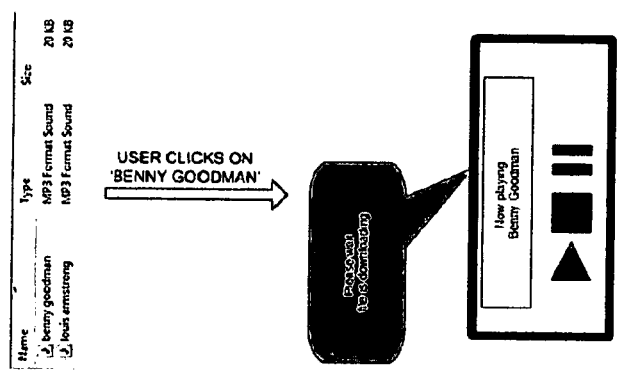

At step 630, application 290 allocates additional virtual clusters, as required for storing the stub file, and the additional virtual clusters are chained to the first virtual cluster. Such virtual cluster chains are shown in FIG. 5B as clusters 44-46 and clusters 50-52. Finally, at step 640, application 290 modifies the directory entry for the stub file, so that the first cluster of the stub file points to the first cluster from step 620, and so that the size of the stub file matches the actual length of the stub file.

At step 410, host device 100 refreshes and identifies the newly-downloaded directory listing. At step 415 a determination is made whether a file is to be downloaded. If so, processing advances to step 420. Otherwise, processing ends.

As shown in FIG. 5A, the user clicks on the "jazz" directory. Momentarily, a place holder message "downloading file list please wait" appears on the user interface. The place holder message is stored in the stub storage area, as shown in FIG. 3, in the hidden cluster corresponding to cluster 31. In the meantime, host device 100 downloads the remote file list for the "jazz" directory, and displays the list shown at the top of the leftmost portion of FIG. 5B. The list contains two files; namely, a "benny goodman" MP3 file, and a "louis armstrong" MP3 file.

At this stage, the root directory includes a local directory for the "jazz" directory at data cluster 13. A "jazz" directory is generated, and includes entries for two stub MP3 files; namely, a stub MP3 file at virtual cluster 44, and a stub MP3 file at virtual cluster 50. The download map includes URLs for the remote "benny goodman" and "louis armstrong" files. The user clicks on "benny goodman" to initiate download of that file.

Referring back to FIG. 4, in general at step 420 host device 100 issues a file read request to the SD file system. The request is transmitted to SD driver 140. SD driver 140 determines from the FAT, which appropriate cluster to read, and finds the cluster value, which corresponds to a virtual cluster. Host device 100 is unaware that the cluster value corresponds to a non-physical cluster, and interprets the value as a legitimate cluster value.

At step 425, SD driver 140 transmits the read request to SD controller 250. SD driver 140 converts the virtual cluster value to a virtual sector value, using a conversion of the form K*V+constant, and issues a read request to the virtual sector. As above, the parameter K is the number of sectors per cluster.

At step 430, SD controller 250 receives the read request. In response, SD controller 250 sends a command to SD application 290 including the virtual sector value, and returns the corresponding hidden sector value to host device 100, using the formula hidden_sector=virtual_sector (mod(K*M).

At step 435, application 290 receives the event from SD controller 250, and converts the sector value to a URL, or to another such pointer to a file on a remote server, using the download map. Application 290 then issues an HTTP GET command, or such other download command, to retrieve the remote file. This operation is performed only once, when the first sector of the file is read.

At step 440, SD driver 140 retrieves the stub data. Host device 100 is unaware that this data belongs to a stub file. The length matches the file length in the directory listing, to ensure consistency. The data is displayed to the user, and includes a message such as "file is currently being downloaded, download will be complete within xx seconds". Generally, the message is refreshed by host device 100. In circumstances where host device 100 does not refresh, the SD card forces a refresh every 2-3 seconds by a refresh operation, or by a disconnect/connect operation using the SD protocol.

Referring to FIG. 5B, in this embodiment the place holder message "Please wait, file is downloading" from the stub file is played to the user. It will be appreciated by those skilled in the art that place holder messages may be displayed to a user as a still image or video clip, or played as an audio file, or both. In one embodiment, the place holder message is the same media type as the file that it corresponds to; i.e., audio messages are played when audio files are being downloaded, and video messages are played when video files are being downloaded.

Figure 5C:
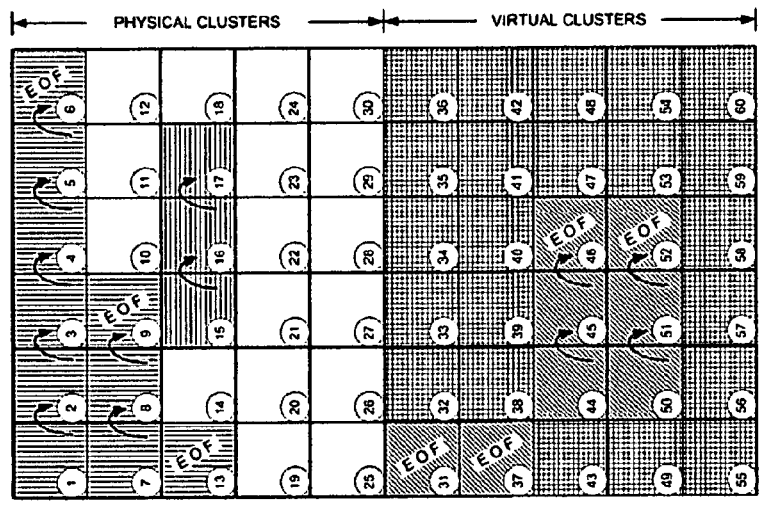
FIG. 5C is a snapshot of a user interface and a file system for a simplified example use case of file downloading, at a stage where a file from a remote server is being downloaded, in accordance with an embodiment of the present invention.
Figure 5C:
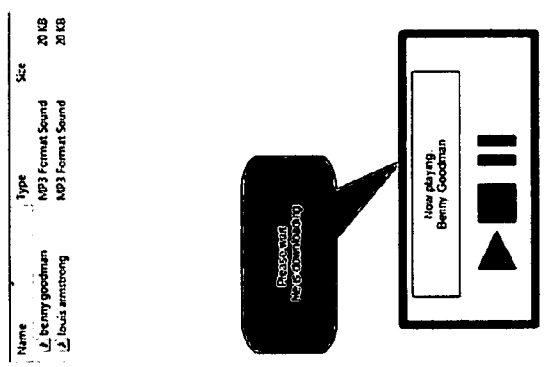

Referring to FIG. 5C, the file being downloaded is stored in physical clusters 15, 16, 17, etc. This is reflected in the entry for the "benny goodman" file in the download map, where cluster 15 is designated.

Referring back to FIG. 4, in general at step 445 application 290 receives the real file content and stores it in the flash memory. The file is downloaded via communication modem 280. As it arrives, application 290 updates the download map for the file with the amount of data received, and updates the first cluster in the cluster chain for the file in the flash memory. Each cluster of the downloaded file is stored in a free cluster in the flash memory, which is then marked as full. Thus it will be appreciated by those skilled in the art that as the file is downloaded a regular file is generated in the FAT, but without a directory item for the file. Instead, the first sector of the file is stored in the download map.

At step 450 host device 100 refreshes the file list. At step 455 a determination is made whether or not the download for the file is complete. If not, processing returns to step 445 where application 290 continues to download the file. Otherwise, if the download is complete then, at step 460, application 290 marks the last cluster of the downloaded file with an EOF.

At step 465, application 290 points the first cluster of the file to the downloaded data cluster chain. Application 290 replaces the directory entry for the file from the virtual cluster value to the physical first cluster of the newly downloaded file. As such, the file entry now points to a legitimate file. The file size is also changed, so as to correspond to the received file length. The file is then removed from the download map.

Figure 5D:
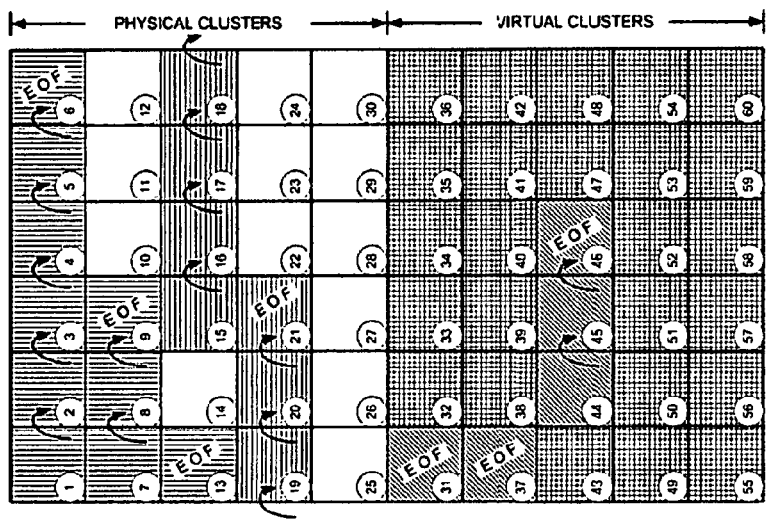
FIG. 5D is a snapshot of a user interface and a file system for a simplified example use case of file downloading, at a stage where download of a file from a remote server is complete, in accordance with an embodiment of the present invention.
Figure 5D:
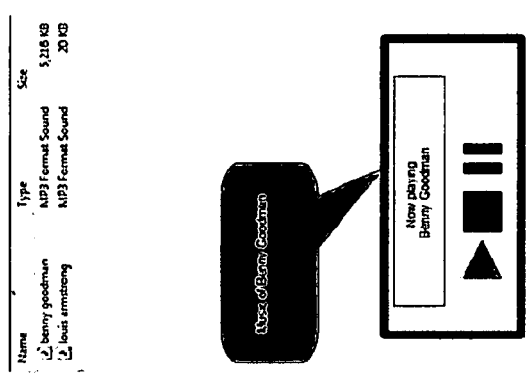

Referring to FIG. 5D, when host device 100 refreshes, the user interface displays the new file, and the user listens to the real Benny Goodman song. The downloaded file is now stored in clusters 15-21, and cluster 21 is marked with an EOF. The downloaded file now appears as a local file in the "jazz" directory, and its entry is removed from the download map.

Figure 7:
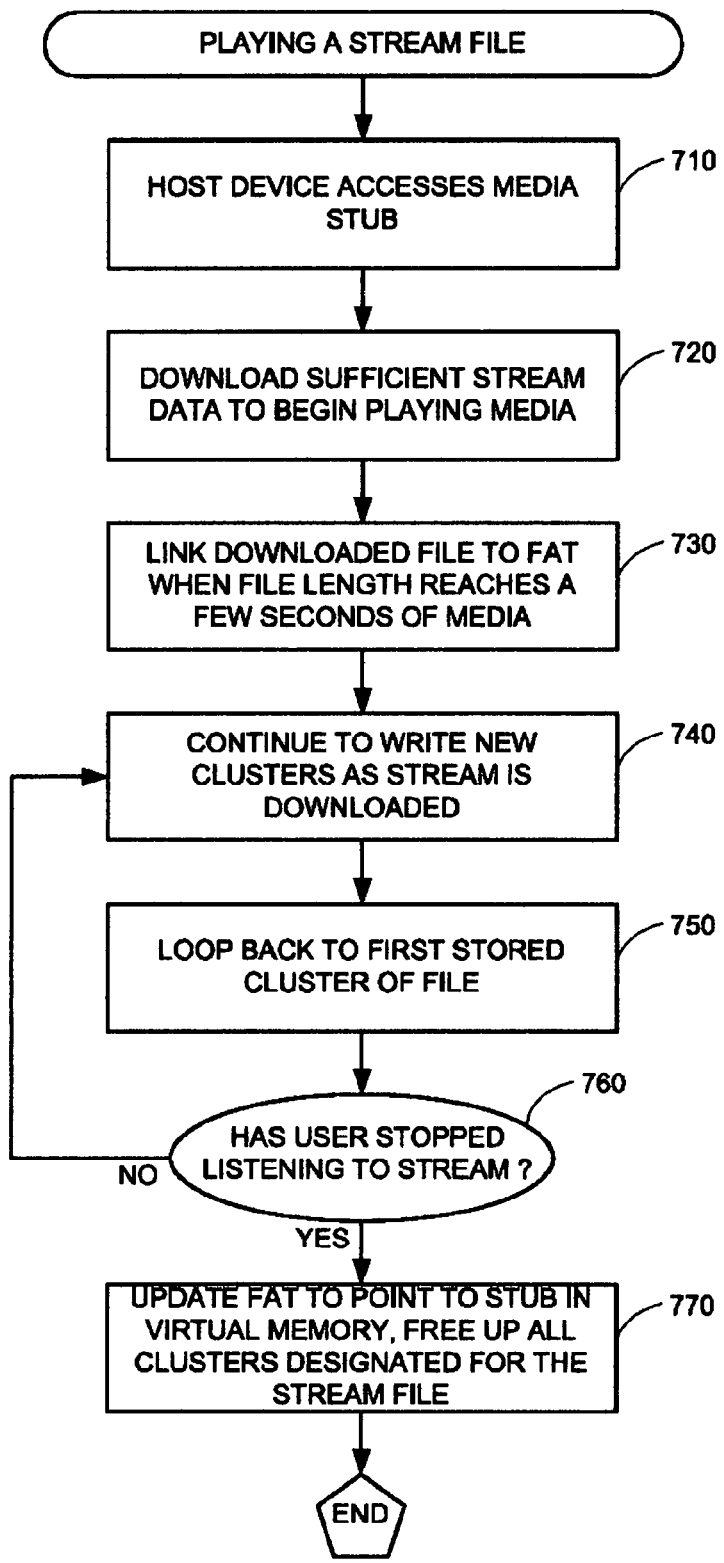
FIG. 7 is a simplified flowchart of a method for playing a streamed file from an SD card, in accordance with an embodiment of the present invention.

Reference is now made to FIG. 7, which is a simplified flowchart of a method for playing a streamed file from an SD card, in accordance with an embodiment of the present invention. At step 710, host device 100 accesses a media stub. At step 720 the stream data associated with the media stub begins downloading, and is dynamically stored in physical file clusters as it arrives, such as file clusters 7-9 in FIG. 3. Application 290 waits until sufficient data arrives to play a few seconds' worth of the media. Then, at step 730, application 290 links the downloaded file to the FAT. The file size is reported as being extremely long. At step 740, application 290 continues to write new clusters of data, as the stream is downloaded for several more seconds. At step 750, the FAT cluster link becomes circular, and application 290 loops back to the first stored cluster for the file.

Figure 8:
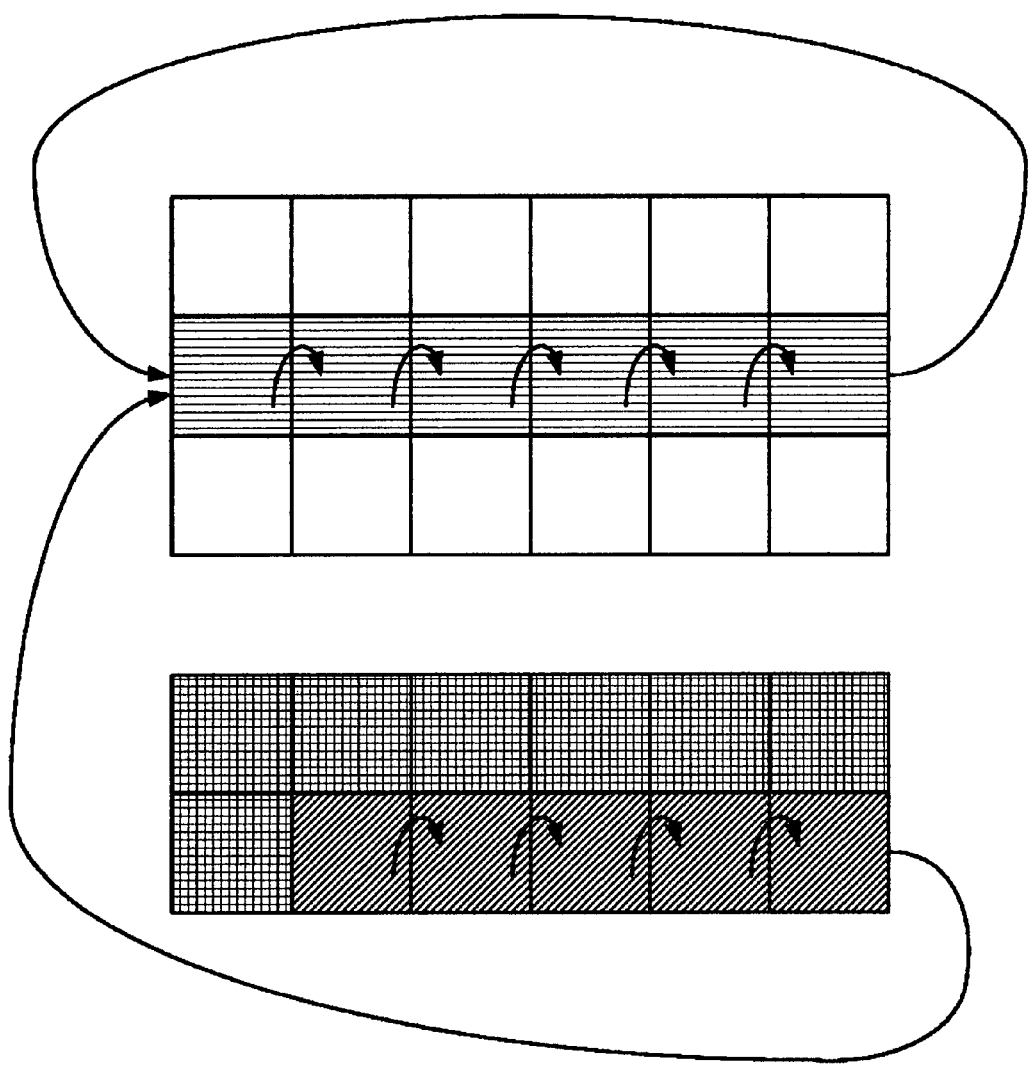
FIG. 8 is an illustration of file streaming using a circular cluster cycle in the FAT, in accordance with an embodiment of the present invention.

In this regard, reference is now made to FIG. 8, which is an illustration of file streaming using a circular cluster cycle in the FAT, in accordance with an embodiment of the present invention. The cross-hatched clusters in FIG. 8 correspond to the FAT legend provided in FIG. 3.

Referring back to FIG. 7, at step 760 a determination is made whether or not the user has stopped listening to the stream. Such a determination may be made by application 290, by identifying a lack of access by host device 100 to the file clusters. If the user has not stopped listening to the stream, then processing returns to step 740 as more data is streamed. Otherwise, if the user has stopped listening to the stream then, at step 770, application 290 updates the FAT to point to a stub in the virtual memory, and frees up all clusters that have been designated for the streamed file.

In addition to downloading of remote files to SD card 210, application 290 may also upload files from SD card 210 to a remote server, and store them in a designated directory. Application 290 may create a directory named "uploads" under the root directory, when the file system of SD card 210 is initialized. The "uploads" directory is generated as a directory list stub in the virtual storage area, and includes a single data cluster. The "uploads" directory is initially set as an empty directory.

Figure 9:
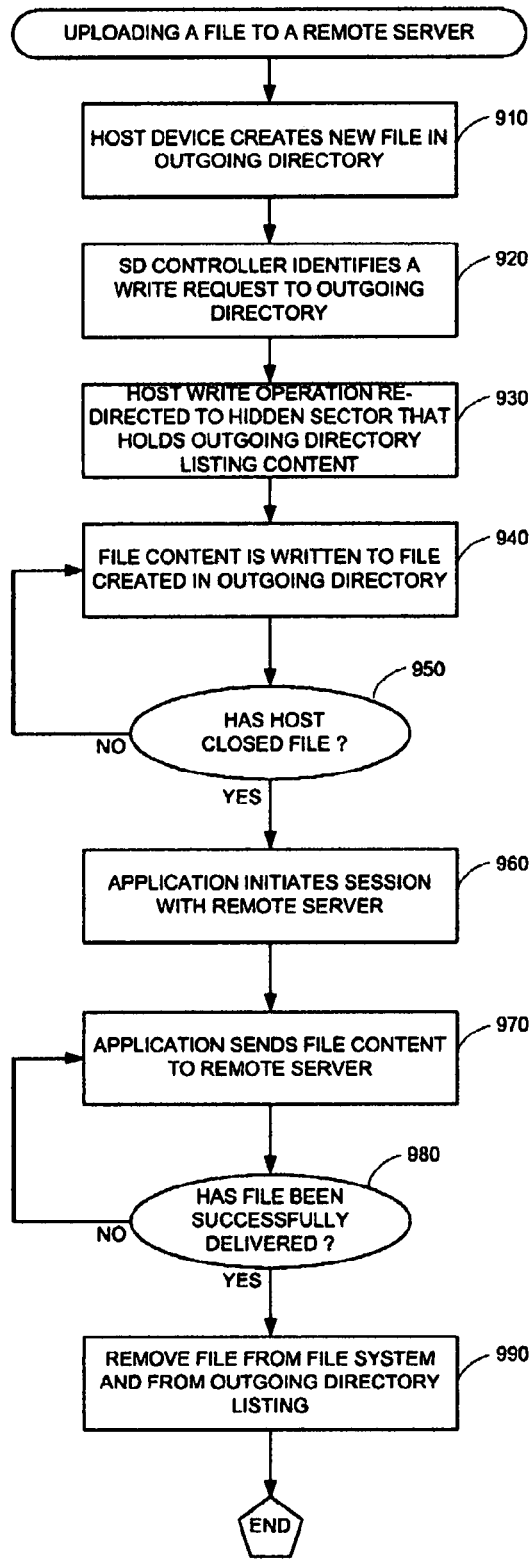
FIG. 9 is a simplified flowchart of a method for uploading a file from an SD card to a remote server, in accordance with an embodiment of the present invention.
Figure 10A:
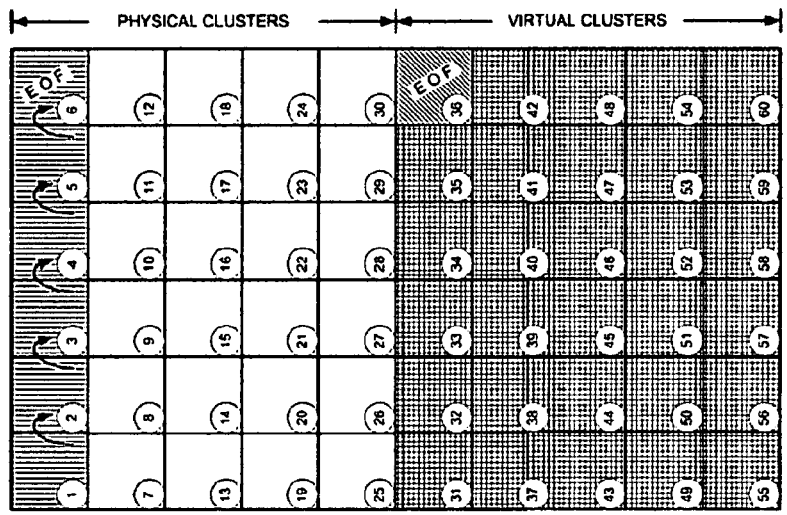
FIG. 10A is a snapshot of a user interface and a file system for a simplified example use case of file uploading, at a stage where a user is selecting a file to upload to a remote server, in accordance with an embodiment of the present invention.
Figure 10A:
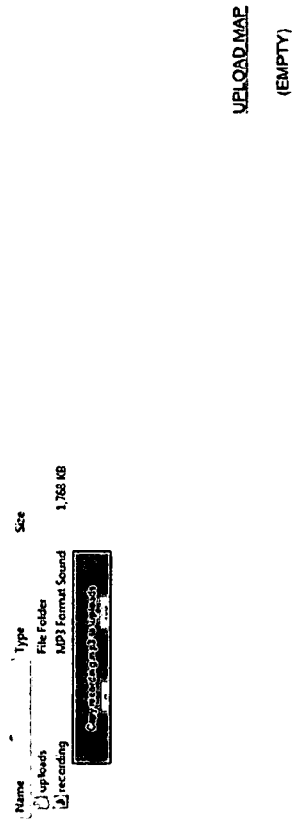
Figure 10B:
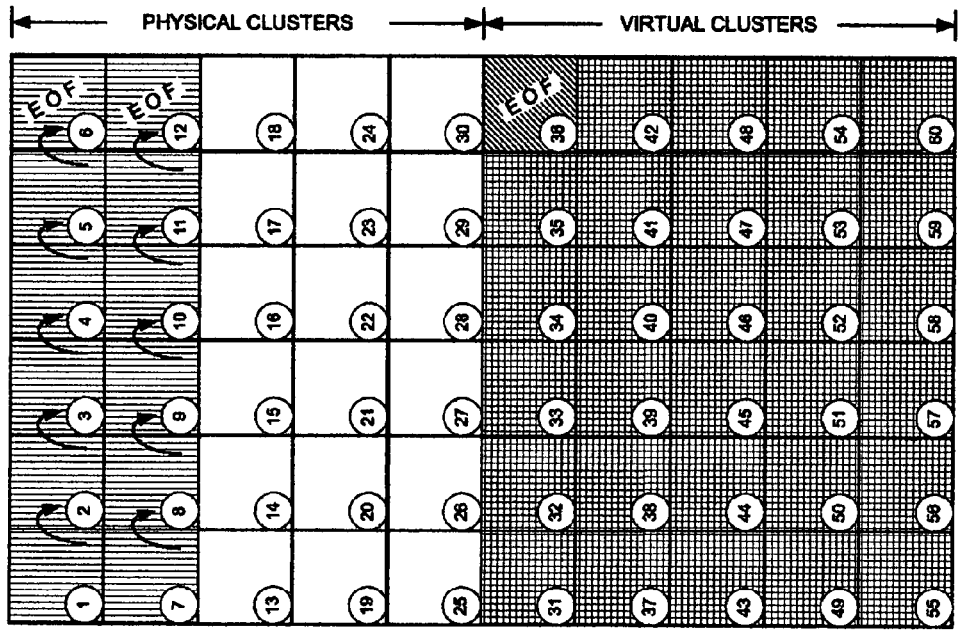
FIG. 10B is a snapshot of a user interface and a file system for a simplified example use case of file uploading, at a stage where a file is being uploaded to a remote server, in accordance with an embodiment of the present invention.

Reference is now made to FIG. 9, which is a simplified flowchart of a method for uploading a file from an SD card to a remote server, in accordance with an embodiment of the present invention. To accompany FIG. 9, reference is also made to FIGS. 10A and 10B, which are snapshots of a user interface and a file system for a simple example use case, during various stages of file upload during operation of the method of FIG. 9. FIG. 10A is divided into three portions. The leftmost portion illustrates a user interface, the middle portion illustrates directory entries and the upload map, and the rightmost portion illustrates the FAT. FIG. 10B is divided into two portions. The left portion illustrates directory entries and the upload map, and the right portion illustrates the FAT. Thus, whereas FIG. 9 describes the steps being performed, the accompanying FIGS. 10A and 10B illustrate states of the user interface and the file system during various ones of the steps. The legends for the cross-hatching on the FATs in FIGS. 10A and 10B are the same as the legend provided in FIG. 3. It will be appreciated by those skilled in the art that the file system illustrated in FIGS. 10A and 10B is simplified, in order to emphasize the workings of an embodiment of the present invention.

Referring to FIG. 9, in general at step 910, when host device 100 is instructed to upload a file to a remote server, it creates a new file in a virtual directory named "uploads". At step 920, SD controller 250 identifies a write request to the "uploads" directory. SD controller may identify such request, since host device 100 issues the write request to a virtual cluster number. SD controller then sends an event to application 290.

At step 930, the host's write request is re-directed to a hidden sector that holds the "uploads" directory listing content. Application 290 recognizes that a new file is being created in the "uploads" directory, and it allows host device 100 to write the file content. At step 940 the file content is written to the file created in the "uploads" directory. The file itself is treated as a regular file in the file system.

FIG. 10A corresponds to a stage where the upload directory listing is displayed in the user interface, and a user has selected a file name "recording.mp3" for upload. As shown in FIG. 10A, the root directory has an entry for a stub "uploads" directory located at virtual cluster 36. The root directory also has an entry for the music file "recording.mp3", which is stored at clusters 1-6.

FIG. 10B corresponds to a stage where the selected file is copied to the physical storage area, and the upload process begins. Referring to FIG. 10B, there is now an "uploads" directory with an entry for the file "recording.mp3" having first cluster 7.

At step 950, application 290 determines whether or not host device 100 has finished writing the file and has closed the file. If not, processing returns to step 940. If host device 100 has closed the file, then at step 960 application 290 initiates a communication session with the remote server, and at step 970 application 290 sends the file content to the remote server.

At step 980, application 290 determines whether or not the file has been successfully delivered to the remote server. If not, processing returns to step 970. If the file has been successfully delivered to the remote server, then at step 990 the file is removed from the file system and from the outgoing directory listing.

In reading the above description, persons skilled in the art will realize that there are many apparent variations that can be applied to the methods and systems described. In particular, it will be appreciated that the present invention applies to general file systems, and is not restricted to FAT file systems.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. An enhanced flash memory card, comprising:
   a flash memory card, comprising:
      a wireless modem for downloading remote directory listings, and media files and streams over the Internet; and
      a memory partitioned into physical data storage clusters; and
   a driver for said flash memory card (i) for managing a file allocation table (FAT) that stores information about physical and virtual data storage clusters, the physical clusters being mapped to real locations in said memory and the virtual clusters having addresses that are higher than the highest address of any real location in said memory, the FAT including stub files for remote directory listings and remote media files and streams, wherein the stub files point to virtual data clusters, (ii) for managing a download conversion map from virtual cluster numbers to pointers of remote media files and streams, and (iii) for storing downloaded directory listings and media files and streams in the physical data storage clusters.

2. The enhanced flash memory card of claim 1 wherein the remote media files and streams are MP3 audio files and streams, respectively.

3. The enhanced flash memory card of claim 1 wherein the remote media files and streams are MP4 video files and streams, respectively.

4. A method for remote file access using flash memory, comprising:
   issuing a read request from a host device to a flash memory file system, the flash memory being represented as a plurality of physical and virtual data storage clusters, the physical clusters being mapped to real locations in the flash memory and the virtual clusters having addresses that are higher than the highest address of any real location in the flash memory, wherein the read request is addressed to a designated virtual data cluster;
   reading a stub file at a physical data cluster of the flash memory that corresponds to the designated virtual data cluster;
   identifying a universal resource locator (URL) for remote file data that corresponds to the designated virtual data cluster;
   receiving the remote file data from the URL; and
   storing the remote file data in physical data clusters of the flash memory.

5. The method of claim 4 wherein the stub file contains a place holder message that is displayed while said receiving remote data is being performed.

\* \* \* \* \*